(12) United States Patent
Franaszek et al.

(10) Patent No.: US 7,386,679 B2
(45) Date of Patent: Jun. 10, 2008

(54) SYSTEM, METHOD AND STORAGE MEDIUM FOR MEMORY MANAGEMENT

(75) Inventors: Peter A. Franaszek, Mt. Kisco, NY (US); Luis A. Lastras, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 10/709,128

(22) Filed: Apr. 15, 2004

(65) Prior Publication Data

US 2005/0235115 A1    Oct. 20, 2005

(51) Int. Cl.
    *G06F 12/08* (2006.01)
(52) U.S. Cl. ...................................... 711/145
(58) Field of Classification Search ................ 711/137, 711/171, 118, 144, 145; 710/22; 712/238, 712/239
    See application file for complete search history.

(56) References Cited

U.S. PATENT DOCUMENTS

| | | | | |
|---|---|---|---|---|
| 4,658,351 A | * | 4/1987 | Teng | 718/103 |
| 4,807,110 A | | 2/1989 | Pomerene et al. | 711/213 |
| 5,361,391 A | | 11/1994 | Westberg | 395/425 |
| 5,423,011 A | * | 6/1995 | Blaner et al. | 712/240 |
| 5,544,342 A | * | 8/1996 | Dean | 711/119 |
| 5,715,421 A | | 2/1998 | Akiyama et al. | 395/421.03 |
| 5,761,706 A | | 6/1998 | Kessler et al. | 711/118 |
| 5,796,971 A | | 8/1998 | Emberson | 395/383 |
| 5,887,151 A | | 3/1999 | Raz et al. | 395/382 |
| 5,996,071 A | * | 11/1999 | White et al. | 712/238 |
| 6,012,106 A | * | 1/2000 | Schumann et al. | 710/22 |
| 6,119,222 A | * | 9/2000 | Shiell et al. | 712/238 |
| 6,134,643 A | * | 10/2000 | Kedem et al. | 711/137 |
| 6,182,201 B1 | | 1/2001 | Arimilli et al. | 711/202 |
| 6,286,075 B1 | | 9/2001 | Stracovsky et al. | 711/5 |
| 6,314,494 B1 | * | 11/2001 | Keltcher et al. | 711/137 |

(Continued)

FOREIGN PATENT DOCUMENTS

EP    0173893 A2    3/1986

(Continued)

OTHER PUBLICATIONS

Adaptive Variation of the Transfer Unit in a Storage Hierarchy, IBM J. Res. Develop., vol. 22, No. 4, Jul. 1978, pp. 405-412—by P.A. Franaszek and B. T. Bennett.

(Continued)

*Primary Examiner*—Pierre-Michel Bataille
(74) *Attorney, Agent, or Firm*—Cantor Colburn LLP; Eustus Nelson

(57) ABSTRACT

A system for memory management including a tag controlled buffer in communication with a memory device. The memory device includes a plurality of pages divided into a plurality of individually addressable lines. The tag controlled buffer includes a prefetch buffer including at least one of the individually addressable lines from the memory device. The tag controlled buffer also includes a tag cache in communication with the prefetch buffer. The tag cache includes a plurality of tags, where each tag is associated with one of the pages in the memory device and each tag includes a pointer to at least one of the lines in the prefetch buffer. Access to the lines in the prefetch buffer is controlled by the tag cache.

5 Claims, 5 Drawing Sheets

U.S. PATENT DOCUMENTS

| | | | |
|---|---|---|---|
| 6,535,961 B2 | 3/2003 | Wilkerson et al. | 711/137 |
| 6,598,123 B1 | 7/2003 | Anderson et al. | 711/133 |
| 6,606,617 B1 | 8/2003 | Bonner et al. | 707/2 |
| 6,678,795 B1 | 1/2004 | Moreno et al. | 711/137 |
| 6,687,794 B2 | 2/2004 | Malik | 711/137 |
| 6,973,547 B2 * | 12/2005 | Nilsson et al. | 711/141 |
| 7,073,030 B2 * | 7/2006 | Azevedo et al. | 711/137 |
| 7,099,999 B2 * | 8/2006 | Luick | 711/137 |
| 7,133,995 B1 * | 11/2006 | Isaac et al. | 711/204 |
| 7,266,676 B2 * | 9/2007 | Tran et al. | 712/238 |
| 2003/0221069 A1 | 11/2003 | Azevedo et al. | 711/136 |
| 2004/0030840 A1 | 2/2004 | Hesse et al. | 711/137 |

FOREIGN PATENT DOCUMENTS

| | | |
|---|---|---|
| JP | 8161230 | 6/1996 |

OTHER PUBLICATIONS

Distributed Prefetch-buffer/Cache Design for High Performance Memory Systems, pp. 254-263, Departments of Computer Science and Electrical Engineering, Duke University, Durham, NC, 1996—by Thomas Alexander and Gershon Kedem.

DRAM-Page Prediction and Prefetching, pp. 267-275, Computer Science Department, Duke University, Durham, NC, 2000 by Haifeng Yu and Gershon Kedem.

On the Stability of Temporal Data Reference Profiles, Microsoft Research, Redmond, WA—by Trishul M. Chilimbi.

TCP: Tag Correlating Prefetchers, by Zhigang Hu of IBM Corp.; Margaret Martonosi of Princeton University; and Stefanos Kaxiras of Agere Systems.

Performance Study of the Filter Date Cache on a Superscalar Processor Architecture, by Julio Sahuquillo, Salvador Petit and Ana Pont of Universidad Politechnica de Valencia, Spain and Veljko Milutinovic of University of Belgrade, Yugoslavia.

A Data Cache with Multiple Cashing Strategies Tuned to Different Types of Locality, by Antonio Gonzalez, Carlos Aliagas and Mateo Valero of Universitat Politecnica de Catalunya, Barcelona, Spain.

Filtering Superfluous Prefetches using Density Vectors by Wei-Fen Lin, Steven K. Reinhardt of University of Michigan; Doug Burger of University of Texas at Austin; and Thomas R. Puzak of IBM Corporation.

Page Fault Behavior and Prefetching in Software DSMs, by Ricardo Bianchini, Raquel Pinto, and Claudio L. Amorim of Federal University of Rio de Janeiro, Brazil, Technical Report ES-401/96, Jul. 1996.

Adaptive Caching for Demand Prepaging, by Scott F. Kaplan, Lyle A. McGeoch, and Megan F. Cole of Amherst College, Massachusetts—ISMM '02, Jun. 20-21, 2002, Berlin Germany.

Time Series Prediction using Recurrent SOM with Local Linear Models, Research Reports B15, Oct. 1997—by Timo Koskela, Markus Varsta, Jukka Heikkonen, and Kimmo Kashi of Helsinki University of Technology, Finland.

Temporal Sequence Processing using Recurrent SOM, by Timo Koskela, Markus Varsta, Jukka Heikkonen, and Kimmo Kaski of Helsinki University of Technology, Finland.

* cited by examiner

SYSTEM, METHOD AND STORAGE MEDIUM FOR MEMORY MANAGEMENT

BACKGROUND OF INVENTION

The invention relates to memory management and in particular, to a tag controlled prefetch buffer management system that is part of a cache system.

In processing systems such as computers, the data to be utilized by a processor is stored in a memory (e.g., main memory, lower level memory) and control logic manages the transfer of data between the memory and the processor in response to requests issued by the processor. The data stored in the main memory generally includes both instructions to be executed by the processor and data to be operated on by the processor. For simplicity, both instructions and true data are referred to collectively herein as "data" unless the context requires otherwise. The time taken by a main memory access is relatively long in relation to the operating speeds of modern processors. To address this, a cache memory with a shorter access time is generally interposed between the main memory and the processor, and the control logic manages the storage of data retrieved from the main memory in the cache and the supply of data from the cache to the processor.

A typical cache is organized into multiple "lines", each line providing storage for a line of data from the main memory which may be many bytes in length. When the processor issues a request for data contained in a particular line in a page, or block, the control logic determines whether that line is stored in the cache. If the line is stored in cache (i.e., there is a cache hit), the data is retrieved from the cache. If the line is not stored in cache (i.e., there is a cache miss), the data must be retrieved from the main memory and the processor is stalled while this operation takes place. Since a cache access is much faster than a lower level memory access, it is clearly desirable to manage the system so as to achieve a high ratio of cache hits to cache misses.

Memory latency is becoming an increasingly important factor in computer system performance. An implication of this increasing importance is that cache faults from the slowest on-chip cache are becoming more expensive in terms of performance. One approach to mitigating this problem is to increase the size of the cache. Increasing the size of the cache may improve performance, however, cache memory is expensive in comparison to the slower, lower level memory. It is therefore important to use cache memory space as efficiently as possible.

One way to improve the efficiency of a cache memory system and to decrease memory latency time is to attempt to anticipate processor requests and retrieve lines of data from the memory in advance. This technique is known as prefetching. Prefetching can be performed by noting dynamic properties of the reference data stream such as sequential and/or stride access. Alternatively, prefetching can be performed on the basis of stored information. This stored information might be related to patterns of access within or between pages, or to hints produced by the compiler and/or programmer.

In cache structures with prefetching, a common approach is to have a prefetch buffer which holds lines that have been prefetched. Having such a separate buffer avoids pollution of the cache proper due to mistaken prefetches. However, it is often difficult to coordinate the contents of such a prefetch buffer with logic that determines what to prefetch as a function of ongoing accesses, or stored information. In addition, searching a prefetch buffer may require multiple associative lookups for a single operation.

SUMMARY OF INVENTION

One aspect of the invention is a system for memory management. The system includes a tag controlled buffer in communication with a memory device. The memory device includes a plurality of pages divided into a plurality of individually addressable lines. The tag controlled buffer includes a prefetch buffer including at least one of the individually addressable lines from the memory device. The tag controlled buffer also includes a tag cache in communication with the prefetch buffer. The tag cache includes a plurality of tags, where each tag is associated with one of the pages in the memory device and each tag includes a pointer to at least one of the lines in the prefetch buffer. Access to the lines in the prefetch buffer is controlled by the tag cache.

Another aspect of the invention is a system for memory management including a random access memory. The random access memory includes at least one of the lines. Each line is associated with a page in a memory device and space in the random access memory is allocated on per line basis. The system also includes a first cache device with a plurality of tags. Each tag corresponds to one of the pages in the memory device and each tag indicates the location in the random access memory of the at least one line associated with the tag.

Another aspect of the invention is a method for memory management. The method includes receiving a fault notification from a first cache device. The fault notification includes a fault page identifier and a fault line identifier. A second cache device is accessed to determine if a line in a random access memory corresponds to the fault page identifier and the fault line identifier. The random access memory includes at least one line associated with a page in a memory device. The second cache device includes a plurality of tags each corresponding to one of the pages in the memory device and each tag indicates the location in the random access memory of the at least one line associated with the page corresponding to the tag. The line corresponding to the fault page identifier and the fault line identifier from the random access memory is transmitted to the first cache device in response to the accessing resulting in locating the line corresponding to the fault page identifier and the fault line identifier in the random access memory. The tag corresponding to the fault page identifier is updated in the second cache device to reflect the transmitting.

Another aspect of the invention is a method for memory management. The method includes receiving a fault notification from a requester. The fault notification includes a fault page identifier and a fault line identifier. The method also includes determining if a tag corresponding to the fault page identifier is located in a tag cache. The tag cache includes a plurality of tags, each tag includes at least one pointer to lines in a prefetch buffer and the tag cache designates at least one of the prefetch lines. In response to locating the tag corresponding to the fault page identifier, a line corresponding to the fault line identifier is transmitted to the requester and the tag corresponding to the fault page identifier is updated to reflect the transmitting. In response to not locating the tag corresponding to the fault page identifier, a new tag corresponding to the fault page identifier is inserted into the tag cache. In addition, the line corresponding to the fault line identifier is transmitted to the requester and the prefetch lines included in the new tag are inserted into the prefetch buffer via the tag cache.

A further aspect of the invention is a computer program product for memory management. The computer program product includes a storage medium readable by a processing circuit and storing instructions for execution by the processing circuit for performing a method that includes receiving a fault notification from a requestor. The fault notification includes a fault page identifier and a fault line identifier. The method also includes determining if a tag corresponding to the fault page identifier is located in a tag cache. The tag cache includes a plurality of tags, each tag includes at least one pointer to lines in a prefetch buffer and the tag cache designates at least one prefetch line. In response to locating the tag corresponding to the fault page identifier, a line corresponding to the fault line identifier is transmitted to the requestor and the tag corresponding to the fault page identifier is updated to reflect the transmitting. In response to not locating the tag corresponding to the fault page identifier, a new tag corresponding to the fault page identifier is inserted into the tag cache. In addition, the line corresponding to the fault line identifier is transmitted to the requestor and the prefetch lines included in the new tag are inserted into the prefetch buffer via the tag cache.

BRIEF DESCRIPTION OF DRAWINGS

Referring now to the drawings wherein like elements are numbered alike in the several FIGURES.

DETAILED DESCRIPTION

Figure 1:
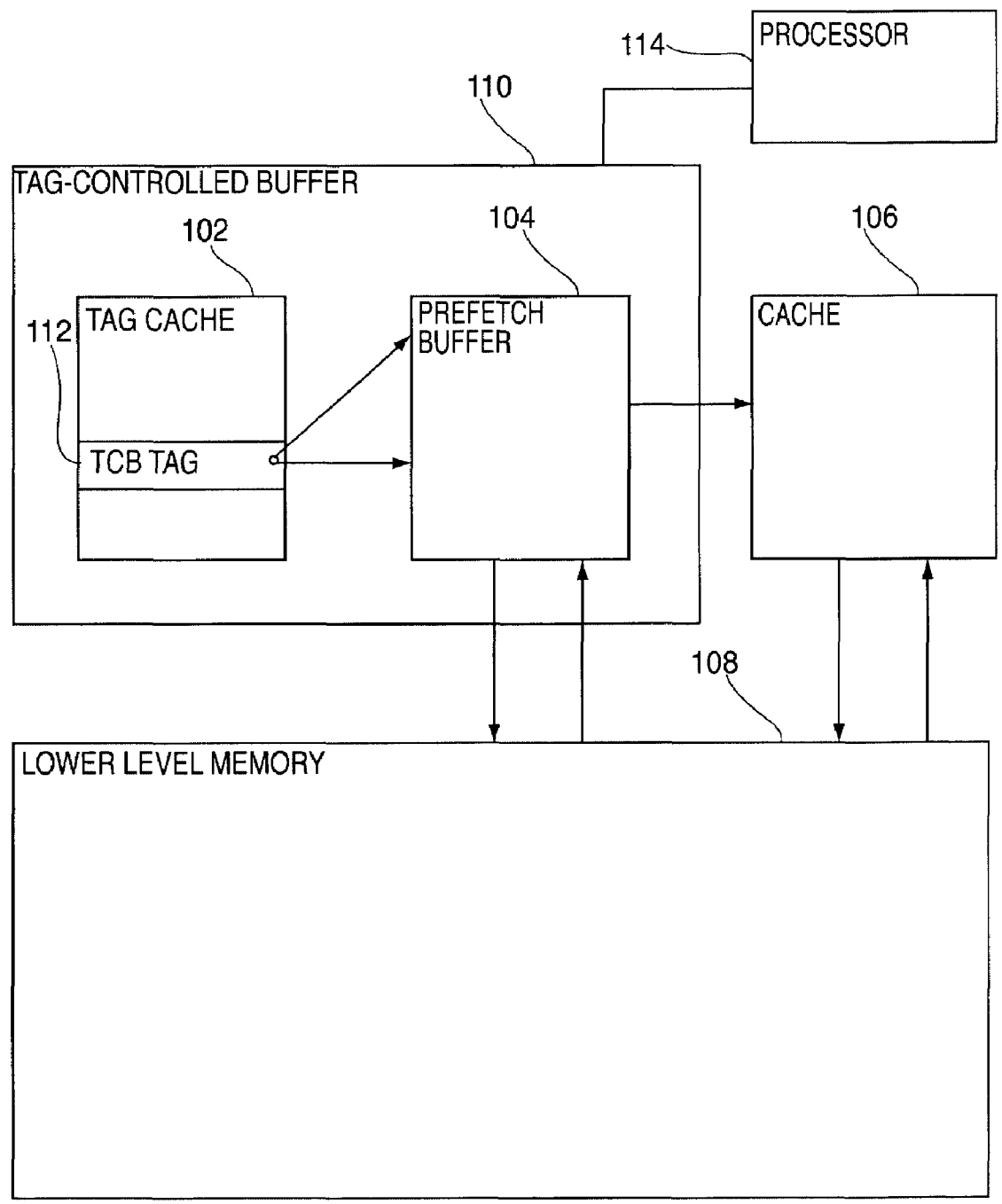
FIG. 1 is a block diagram of a cache system that includes a prefetch buffer and a tag cache in accordance with an exemplary embodiment of the present invention.

An exemplary embodiment of the present invention includes a prefetch buffer with contents that are controlled by tags. Each tag corresponds to one page in memory. The tag includes access histories for lines in the page, or between the page corresponding to the tag and other pages. To determine if a particular line from a page is in the prefetch buffer, a search is performed using the tags. The tags include pointers to locations in the prefetch buffer (e.g., a shared memory pool) for lines that are stored in the prefetch buffer. Tags also hold relevant reference information to aid in future prefetching. The tags control the presence and/or absence of lines in the prefetch buffer and all access to the lines in the prefetch buffer is via the tags. An advantage to this design is that all searches are centered on the structure holding the tags, thereby avoiding multiple associative lookups for a single operation. Further, the design may help to insure that recently entered tags are guaranteed space for their prefetched lines.

An exemplary embodiment of the present invention includes a memory system with a level two (L2) cache, a prefetch buffer, and a tag cache containing recently referenced tags. Each tag in the tag cache is associated with an individual page in main or lower level memory. In an exemplary embodiment of the present invention, each individual page within the lower level memory is four thousand (4K) bytes. Tags are held in memory and are accessed on references to the prefetch buffer. Searches for tags associated with a given page in lower level memory are performed in any manner known in the art for cache memory (e.g., by associative search within a congruence class). In an exemplary embodiment of the present invention, it is assumed, for simplicity, that the tag cache is fully associative. The tags include information used in prefetch or replacement decisions. In an exemplary embodiment of the present invention, the tags include information about what lines should be fetched from a page, given a cache fault occurring on one of its lines, as well as some flag bits. The prefetch buffer, along with the tag cache is referred to collectively as a tag-controlled buffer (TCB).

Certain events (e.g., a reference to one of the lines in a page) may cause a page tag to be fetched (e.g., from a page table) and placed in the tag cache, possibly displacing one or more other tags. The information held in the tag is used to prefetch lines from the page corresponding to the tag, as well as possibly tags from other pages. Fetched lines are placed in a shared prefetch buffer that may be implemented by a shared memory pool that resides on the processor integrated circuit. The prefetched lines associated with a tag are placed in the prefetch buffer, at places determined by a free space list that is maintained by hardware and/or software. If there is insufficient space for the prefetched lines, other tags are deleted from the tag cache and written back to memory so as to free sufficient space. In addition, the lines in the prefetch buffer that correspond to the deleted tags are removed from the prefetch buffer. As lines are referenced (i.e., to satisfy L2 cache faults), these lines may be deleted from the buffer and placed in the L2 cache. Space occupied by such lines in the prefetch buffer is then placed on the free space list. Displaced tags are updated and written back to memory.

FIG. 1 is a block diagram of an exemplary cache system that includes a L2 cache 106, a lower level memory 108, a prefetch buffer 104, a tag cache 102 and a processor 114 in accordance with an exemplary embodiment of the present invention. For purposes of illustration, it is assumed that the lower level memory 108 is divided into pages, each of 4K bytes. In addition, cache lines are assumed to contain one hundred and twenty-eight (128) bytes, so that there are thirty-two (32) lines per page. The tag-controlled buffer (TCB) 110 includes the tag cache 102 and the prefetch buffer 104. As shown in FIG. 1, the TCB 110 is in communication with both the cache 106 and the lower level memory 108 to allow the prefetch buffer to transfer lines into the cache 106, to read data from the lower level memory, and to read/write tags into the lower level memory 108. In addition, the cache 106 is in communication with the lower level memory 108 to move data between the two. The TCB 110 is also in communication with the processor 114. The processor 114 includes instructions to implement the processes described herein and may be physically located in a variety of devices (e.g., on the TCB 110, on a memory controller) that are accessible by the TCB 110. Also, as is known in the art the instructions may be physically located on one or more processors 114.

The tag cache 102 depicted in FIG. 1 includes recently referenced TCB tags 112 which include pointers to one or more locations in the prefetch buffer 104. In addition, the TCB tags 112 may include other information related to lines held in the prefetch buffer 104. In an exemplary embodiment of the present invention, the tag cache 102 is organized as a standard cache structure with the storage of TCB tags 112 divided into a set of equivalence classes, where the TCB tags 112 are searched for by equivalence class. Alternative cache structures known in the art may be implemented by the tag cache 102. In an exemplary embodiment of the present invention, access to the contents of the prefetch buffer 104 is only via the tag cache 102.

Figure 2:
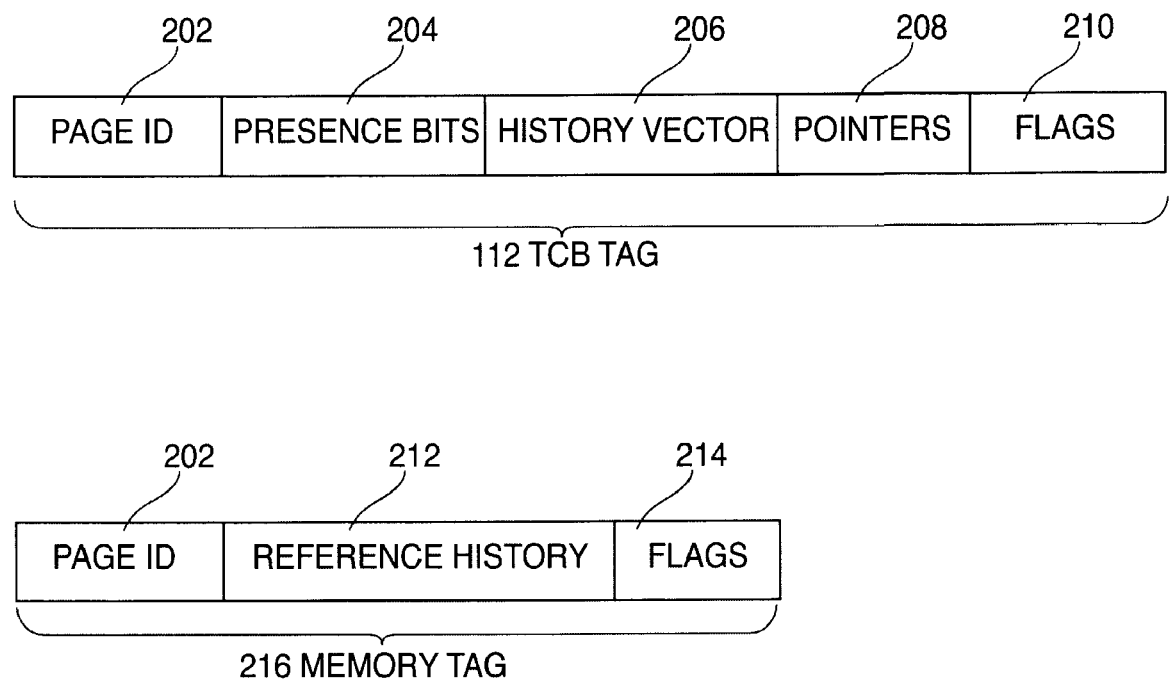
FIG. 2 depicts the contents of tags in an exemplary embodiment of the present invention.

FIG. 2 depicts the contents of tags in an exemplary embodiment of the present invention. The TCB tags 112 are stored in the tag cache 102 and the memory tags 216 are stored in lower level memory 108. An exemplary embodiment of a TCB tag 112 includes a page identification field 202, a presence bits field 204, a history vector field 206, a pointers field 208 and a flags field 210. The page identification field 202 includes the address of the page in lower level memory 108 (i.e., the real address). The presence bits field 204 includes one bit for each line in the page. As described previously, for pages that that are 4K, with lines of one hundred and twenty-eight (128) bytes, there are thirty-two (32) lines per page. Therefore, there are thirty two (32) presence bits included in the presence bits field 204, each corresponding to a different line in the page. The presence bit is set to "1" if the corresponding line is currently included in the prefetch buffer 104 and the presence bit is set to "0" if the corresponding line is not currently included in the prefetch buffer 104.

The history vector field 206 in the TCB tag 112 includes a collection of information regarding how lines in the page have been referenced in the past. As the TCB tag 112 is accessed and lines are referenced, this field may be updated and used to assist in making a determination about what data should be included in the prefetch buffer 104. In an exemplary embodiment of the present invention, the history vector field 206 is stored as a history sequence or vector containing the thirty-two (32) most recent line references from the page. The pointers field 208 contains data that indicates the location of the lines in the page that are currently located in the prefetch buffer 104. The pointers field 208 includes a pointer to a prefetch buffer location corresponding to each line from the page that is currently located in the prefetch buffer 104, as determined by the value of the presence bits field 204. The flags field 210 includes spare bits that my be utilized for other purposes, such as the status of the page.

When the TCB tag 112 is ejected from the tag cache 102, a subset of the TCB tag 112 is stored back into lower level memory 108 as a memory tag 216. The memory tag 216 depicted in FIG. 2 includes the page identification field 202, a reference history field 212 and a flags field 214. The page identification field 202 is the same field discussed previously in reference to the TCB tag 112 and it includes the real address. In an exemplary embodiment of the present invention, the reference history field 212 includes the same data as the history vector field 206 in the TCB tag 112. In alternate exemplary embodiments, the reference history field 212 in the memory tag 216 includes a subset and/or additional data than the history vector field 206 in the TCB tag 112. The data in the reference history field 212 may be utilized to determine which lines from a page should be prefetched when a tag corresponding to the page is entered into the tag cache 202. The flags field 214 contains spare bits that may be utilized for other purposes. The TCB tag 112 and memory tag 216 described in reference to FIG. 2 are examples of one method of implementation. As is known in the art they may be modified by adding and/or removing fields without departing from the spirit of the invention.

Figure 3:
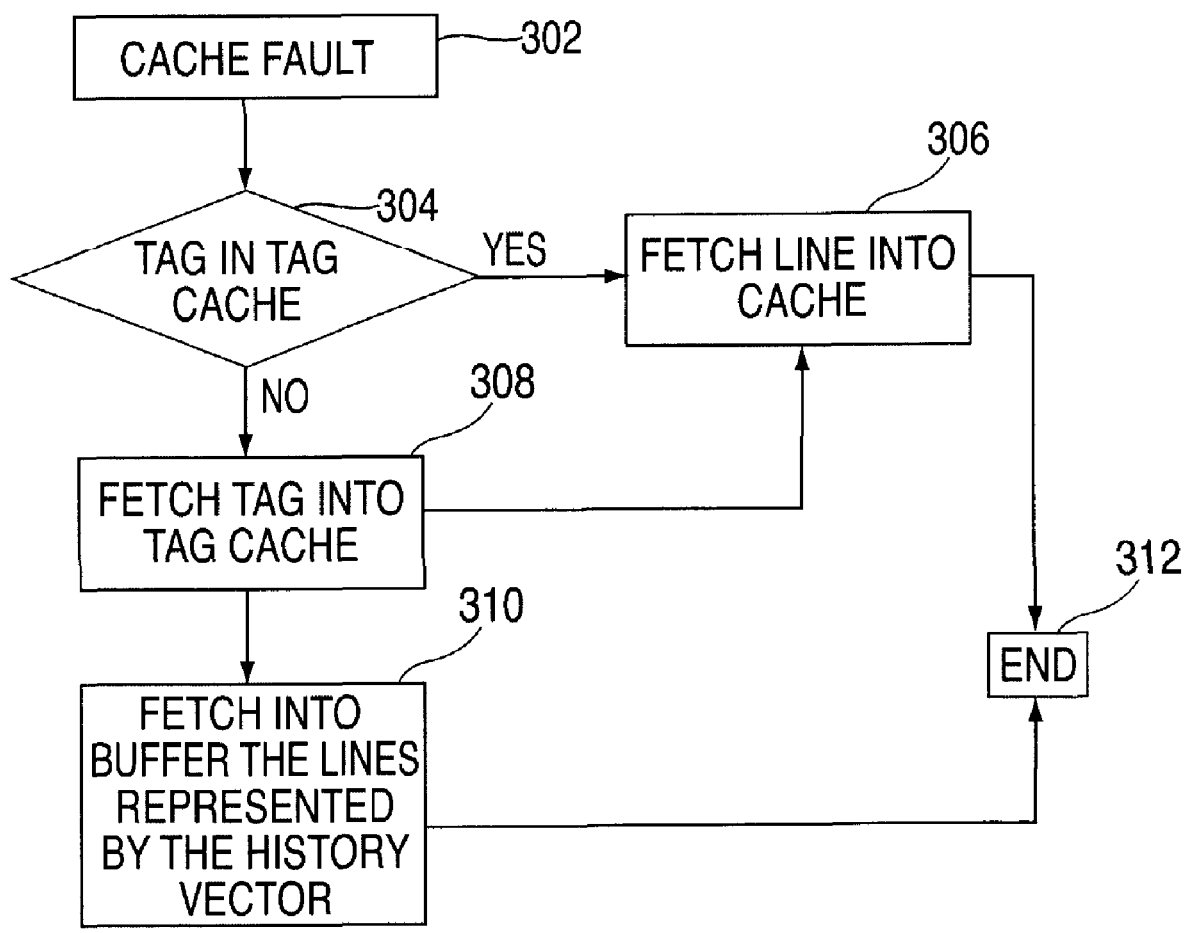
FIG. 3 is a flow diagram of a method for performing prefetching in an exemplary embodiment of the present invention.

FIG. 3 is a flow diagram of a method for performing prefetching in an exemplary embodiment of the present invention. At step 302, a cache fault occurs as a result of a reference to a line not currently in the cache 106. When the cache fault occurs, the faulted line is fetched either from the prefetch buffer 104 or from lower level memory 108. At step 304, a check is made to determine if a TCB tag 112 associated with the faulted line is currently in the tag cache 102. This is performed by accessing the tag cache 102 and searching the page identification fields 202 for a page identification that matches the page identification associated with the faulted line. As described previously, the searching is performed using standard cache methods such as performing an associative search within a congruence class.

If a TCB tag 112 corresponding to the page where the faulted line is stored in lower level memory is located in the tag cache 102, then step 306 is performed to fetch the faulted line into the cache 106. The presence bits field 204 is examined for the value of the bit corresponding to the faulted line. If the bit value indicates that the faulted line is located in the prefetch buffer, then the line is moved into to the cache 106 and deleted from the prefetch buffer. The line is effectively removed by changing the bit value corresponding to the line to "0" because access to the prefetch buffer 104 is through the tag cache 102. In addition, the value of the pointer corresponding to the faulted line in the pointers field 208 may be deleted in order to delete the faulted line from the prefetch buffer. Alternatively, the bit value associated with the faulted line may indicate that the faulted line is not currently located in the prefetch buffer (e.g., the bit value has a value of "0"). In this case, the faulted line is fetched directly into the cache 106 from the lower level memory. Once the line has been fetched into the cache 106, processing ends at step 312.

If a TCB tag 112 corresponding to the page where the faulted line is stored in lower level memory is not located in the tag cache 102, as determined at step 304, then step 308 is performed to fetch the memory tag 216 associated with the faulted line into the tag cache 102 and to create a TCB tag 112 associated with the page containing the faulted line. The memory tag 216 may be located in lower level memory 108 or in the cache 106. Once a TCB tag 112 associated with the faulted line is added to the tag cache 102, step 306 is performed as described previously, by fetching the faulted line directly into the cache 106 from the lower level memory. Once the line has been fetched into the cache 106, processing ends at step 312. In an alternate exemplary embodiment, the order of performing steps 306 and 308 is reversed, resulting in fetching the line into the cache 106 first and then creating the TCB tag 112 in the tag cache 102. In another alternate exemplary embodiment, steps 306 and 308 may be executed concurrently.

In addition, to step 306, once step 308 has been performed, step 310 is executed to fetch lines associated with the faulted line into the prefetch buffer 104, if the associated lines are not already contained in the cache 106 or the prefetch buffer 104. In an exemplary embodiment of the present invention, the associated lines are those that have entries in the history vector field 206 of the TCB tag 112. Any algorithms known in the art for determining lines to prefetch may be implemented by an exemplary embodiment of the present invention. This may result in additional TCB tags 112 being entered into the tag cache 102 and/or additional lines being entered into the prefetch buffer 104. In step 310, the presence bits field 204 of the TCB tag 112 is updated to reflect the corresponding lines contained in the prefetch buffer 104. When step 310 is completed, processing ends at step 312.

Figure 4:
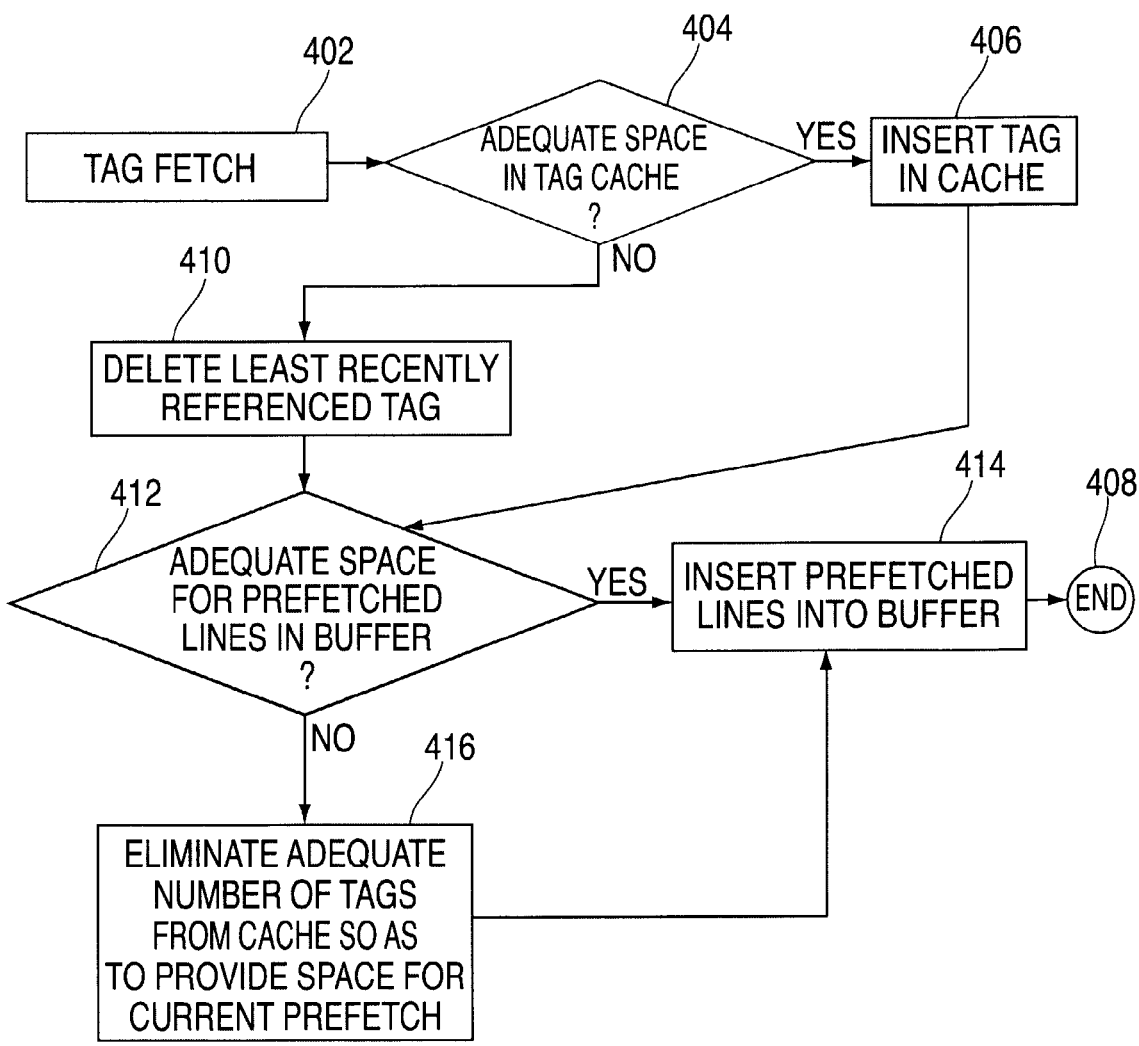
FIG. 4 is a flow diagram of replacement logic for the tag cache that may be utilized by an exemplary embodiment of the present invention.

FIG. 4 is a flow diagram of replacement logic for the tag cache that may be utilized by an exemplary embodiment of the present invention. For simplicity in describing the cache replacement logic, a least recently used (LRU) replacement algorithm for the tag cache 102 is assumed. Other cache replacement logic as is known in the art may also be utilized by exemplary embodiments of the present invention. For the LRU replacement logic, the TCB tags 112 are ordered according to how recently they have been referenced. Here a reference includes an action which reads or modifies the TCB tag 112. At step 402, a current TCB tag 112 is created by fetching and augmenting a memory tag 216. The current TCB tag 112 is inserted into the tag cache 102 in the most-recently-referenced position in the ordering. Alternatively, at step 402, a current TCB tag 112 is created by reading or modifying a TCB tag 112 already located in the tag cache 102.

At step 404, a determination is made about whether there is adequate space in the tag cache 102 for the current TCB tag 112. If there is adequate space in the tag cache 102 then step 406 is performed to insert the current TCB tag 112 into the tag cache 102 if it does not already exist in the tag cache 102 and processing continues at step 412. Alternatively, if additional space is required in the tag cache 102, then step 410 is performed and the least recently referenced TCB tag 112 is deleted from the tag cache 102. This deleting is performed by updating the TCB tag 112 to create the memory tag 216 and writing the memory tag 216 back to lower level memory 108. In addition, lines from this page referenced by the TCB tag 112 that are currently held in the prefetch buffer are then added to the free space list. In an exemplary embodiment of the present invention, the memory tag 216 as written back includes a page identifier in the page identifier field 202, a reference history vector of the thirty-two (32) most recently referenced lines from this page in the reference history vector field 212, as well as the above mentioned flag bit fields 214.

Next, at step 412, a check is made to determine if there is adequate space for the currently prefetched lines associated with the current TCB tag 112 in the prefetech buffer 104. If there is enough space for the currently prefetched lines then step 414 is performed to insert the currently prefetched lines into the prefetch buffer 104. As described previously, this is performed by adding the currently prefetched lines to the buffer and updating the corresponding TCB tag 112 to signify the presence (via setting the corresponding bits in the presence bits field 204 to a "1") and location (via updating data in the pointer field 208) of the new lines in the prefetch buffer 104. Processing then ends at step 408. Alternatively, if it is determined, at step 412, that there is not adequate space for the currently prefetched lines associated with the current TCB tag 112 then step 416 is performed to free up space in the prefetch buffer 104. At step 416, TCB tags 112 and associated lines in the prefetch buffer 104 are deleted until there is enough free space in the prefetch buffer 104 for the currently prefeteched lines associated with the current TCB tag 112. This may be performed using a LRU algorithm. Processing then continues to step 414 as described previously.

Figure 5:
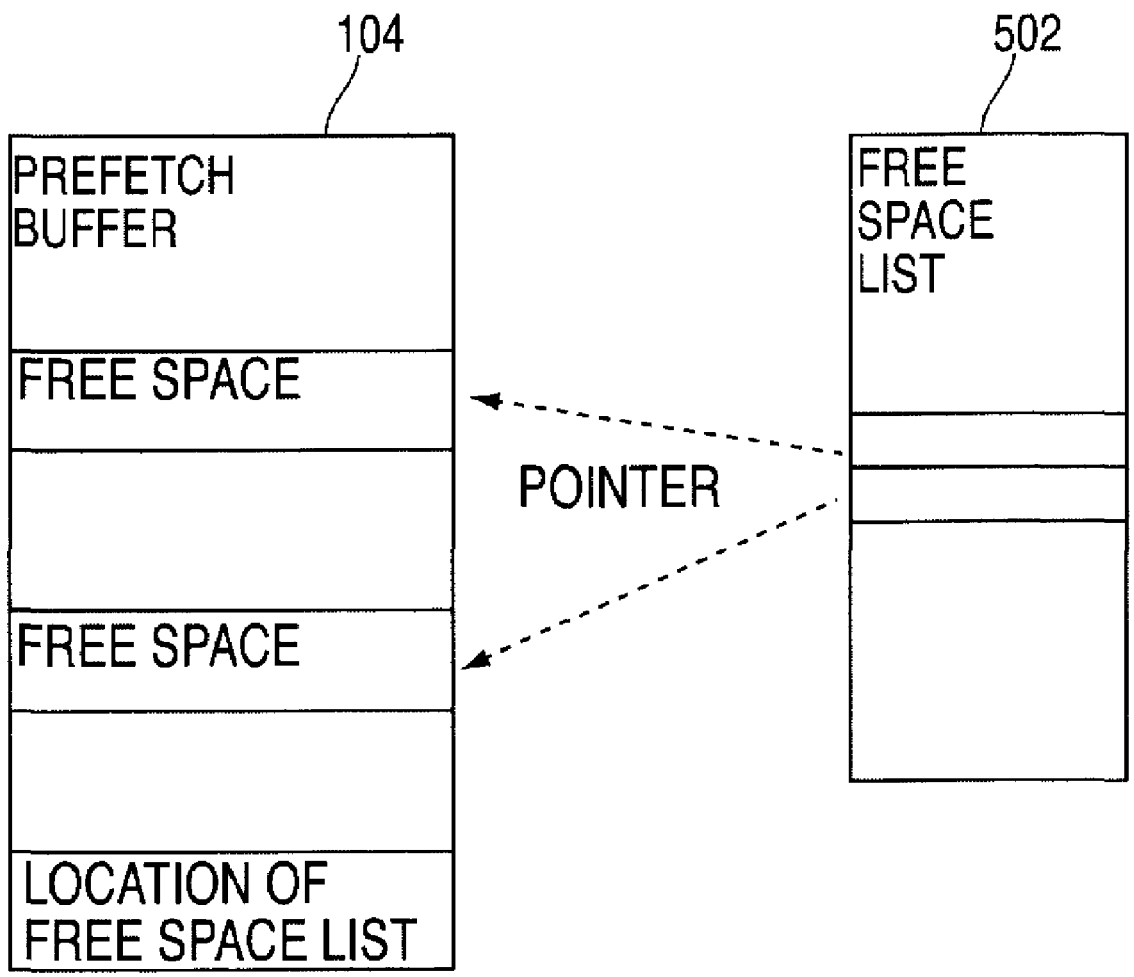
FIG. 5 is a block diagram of an exemplary embodiment of storage allocation in the prefetch buffer.

FIG. 5 is a block diagram of an exemplary embodiment of storage allocation in the prefetch buffer 104. FIG. 5 illustrates the operation and use of a free space list 502 that contains a list of the available locations for holding cache lines in the prefetch buffer 104. As space is freed up as indicated above, via the deletion of entries in the tag cache 102, the location used by the corresponding lines are added to the free space list 502. As space is allocated, the locations of the added space are deleted from the free space list 502. Any data structures and/or methods, both hardware and/or software, known in the art may be utilized to implement the free space list 502. For example, the free space list 502 may be implemented by a linked list and associated logic.

Exemplary embodiments of the present invention may be utilized with systems that include other sizes of pages, lines, tags and cache than those specifically discussed above. In addition, exemplary embodiments of the present invention are not limited to particular levels of cache (e.g., L2 as described previously) and may be applied to any level of a storage hierarchy.

An exemplary embodiment of the present invention includes having the location of prefetched lines in a prefetch buffer being designated by pointers in tag entries in a tag cache. An advantage to this design is that all searches are centered on the structure holding the tags, thereby avoiding multiple associative lookups for a single operation. This results in only a single search being required when attempting to access a cache line which may be in the prefetch buffer, along with whatever other lines from the same page are resident in the prefetch buffer, despite the fact that both the associated tag as well as the cache line need to be found. In addition, when a tag is flushed from the tag cache and written back to memory, the space for its associated lines in the prefetch buffer is freed. This may help to insure that recently entered tags are guaranteed space for their associated prefetched lines.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for memory management, the method comprising:

receiving a fault notification from a first cache device, the fault notification including a fault page identifier and a fault line identifier;

accessing a second cache device to determine if a line in a random access memory corresponds to the fault page identifier and the fault line identifier, wherein:

the random access memory includes at least one line associated with a page in a memory device;

the second cache device includes a plurality of tags each corresponding to one of the pages in the memory device;

each tag indicates the location in the random access memory of the at least one line associated with the page corresponding to the tag; and each tag includes a reference history field that includes information about how lines in the corresponding page have been accessed in the past and is utilized to determine which lines from the corresponding page should be added to the random access memory when the tag is added to the second cache device;

transmitting the line corresponding to the fault page identifier and the fault line identifier from the random access memory to the first cache device in response to the accessing resulting in locating the line corresponding to the fault page identifier and the fault line identifier in the random access memory; and updating the tag in the second cache device corresponding to the fault page identifier to reflect the transmitting.

2. A method for memory management, the method comprising:

receiving a fault notification from a requestor, the fault notification including a fault page identifier and a fault line identifier;

determining if a tag corresponding to the fault page identifier is located in a tag cache, wherein the tag cache includes a plurality of tags, each tag includes a reference history field including information about how lines in the corresponding page have been accessed in the past and at least one pointer to lines in a prefetch buffer;

in response to locating the tag corresponding to the fault page identifier:

transmitting a line corresponding to the fault line identifier to the requestor; and updating the tag corresponding to the fault page identifier to reflect the transmitting; and in response to not locating the tag corresponding to the fault page identifier:

inserting a new tag corresponding to the fault page identifier into the tag cache;

transmitting the line corresponding to the fault line identifier to the requestor; and inserting prefetch lines associated with the new tag into the prefetch buffer, wherein the inserting is performed via the tag cache and the prefetch lines are determined in response to contents of the reference history field in the new tag.

3. The method of claim 1 further comprising retrieving the line corresponding to the fault line identifier from a memory device.

4. The method of claim 1 further comprising retrieving the line corresponding to the fault line identifier from the prefetch buffer, wherein the retrieving is via the tag cache.

5. The method of claim 1 wherein the requestor is a cache device.

* * * * *